(12) United States Patent
Sadot et al.

(10) Patent No.: US 10,914,633 B2
(45) Date of Patent: Feb. 9, 2021

(54) ULTRAHIGH RESOLUTION PHOTONIC SPECTRAL PROCESSOR

(71) Applicants: B. G. NEGEV TECHNOLOGIES AND APPLICATIONS LTD., AT BEN-GURION UNIVERSITY, Beer Sheva (IL); BAR ILAN UNIVERSITY, Ramat Gan (IL)

(72) Inventors: Dan Sadot, Kfar Bilu (IL); Zeev Zalevsky, Rosh Ha'ayin (IL); Tomer Yeminy, Ramat Gan (IL); Sagie Asraf, Petach Tikva (IL)

(73) Assignees: Bar Ilan University, Ramat Gan (IL); B. G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 0 days.

(21) Appl. No.: 16/294,113

(22) Filed: Mar. 6, 2019

(65) Prior Publication Data
US 2019/0277694 A1 Sep. 12, 2019

Related U.S. Application Data

(60) Provisional application No. 62/639,519, filed on Mar. 7, 2018.

(51) Int. Cl.
*G01J 5/02* (2006.01)
*G01J 3/28* (2006.01)
(Continued)

(52) U.S. Cl.
CPC .......... *G01J 3/2823* (2013.01); *G02B 5/1842* (2013.01); *G02B 5/1861* (2013.01); *H04B 10/671* (2013.01); *H04B 10/676* (2013.01)

(58) Field of Classification Search
CPC .......... G01J 3/2823; G01J 3/26; G01J 3/1804; G02B 5/1842; G02B 5/1861;
(Continued)

(56) References Cited

U.S. PATENT DOCUMENTS

| 4,172,663 A | * | 10/1979 | Byer | G01J 9/02 356/454 |
| 2007/0296969 A1 | * | 12/2007 | Goldstein | G01J 3/0229 356/328 |

(Continued)

OTHER PUBLICATIONS

Weiner et al., "Femtosecond pulse shaping for synthesis, processing, and time-to-space conversion of ultrafast optical waveforms," 1998, IEEE Journal of Selected Topics in Quantum Electronics, vol. 4, No. 2, pp. 317-331. (Year: 1998).*

*Primary Examiner* — Kiho Kim
(74) *Attorney, Agent, or Firm* — Roach Brown McCarthy & Gruber, P.C.; Kevin D. McCarthy

(57) ABSTRACT

Disclosed are a method for achieving ultrahigh spectral resolution and a photonic spectral processor, which is designed to carry out the method. The disclosed photonic spectral processor overcomes the current 0.8 GHz spectral resolution limitation. The new spectral processor uses a Fabry-Perot interferometer array located before the dispersive element of the system, thus significantly improving the spectral separation resolution, which is now limited by the full width at half maximum of the Fabry-Perot interferometer rather than the spectral resolution of the dispersive element spectral as is the current situation. A proof of concept experiment utilizing two Fabry-Perot interferometers and a diffractive optical grating with spectral resolution of 6.45 GHz achieving high spectral resolution of 577 MHz is described.

14 Claims, 3 Drawing Sheets

(51) Int. Cl.
*G02B 5/18* (2006.01)
*H04B 10/67* (2013.01)

(58) Field of Classification Search
CPC .. H04B 10/671; H04B 10/676; H04B 10/116; H04J 14/02; H04J 14/04
See application file for complete search history.

(56) References Cited

U.S. PATENT DOCUMENTS

2009/0147212 A1* 6/2009 Wu ..................... G02B 6/2931
  349/196
2014/0119724 A1* 5/2014 Chi ..................... H04B 10/071
  398/21
2017/0050555 A1* 2/2017 Chen ..................... F21S 41/635

* cited by examiner

ULTRAHIGH RESOLUTION PHOTONIC SPECTRAL PROCESSOR

FIELD OF THE INVENTION

The invention is from the field of optics. Specifically the invention is from the field of photonic spectral processors.

BACKGROUND OF THE INVENTION

Publications and other reference materials referred to herein are numerically referenced in the following text and respectively grouped in the appended Bibliography which immediately precedes the claims.

Optical spectral processing is a very useful technique employed in many optical applications such as optical pulse shaping [1], dispersion compensation [2-4], equalization [5-7], and secure optical communications [9].

A photonic spectral processor (PSP) is commonly composed of a dispersive element to separate the light's frequency components, which is followed by a modulator to encode the amplitude and phase of each wavelength [1-4]. The performance of the PSP is determined by its spectral resolution and addressability, which depend on the dispersive element's resolution and the phase modulator's technology, respectively [9].

Currently proposed PSPs utilize various dispersive elements such as reversed dispersion fibers [8], super-structured fiber Bragg gratings (SS-FBGs) [10,11] and waveguide grating routers (WGRs) [12,13]. The modulation has been performed by several devices such as a polymer thermos-optic lens [4], deformable mirror [14] and a spatial light modulator (SLM) [15, 16]. Recently, a high resolution PSP using a WGR with free spectral range (FSR) of 200 GHz and 250 channels has been proposed [17]. However, fabricating such a WGR requires both very large delay and high phase accuracy at its output [17]. Since these requirements are beyond the standard fabrication tolerances, for the fabricated WGR an additional SLM was needed to correct the phase errors [17, 18]. Another approach was to use ultra-violet pulsed laser that inscribes permanent optical path changes to the waveguide [19]. These WGR fabrication requirements resulted in a resolution limit of 0.8 GHz.

It is a purpose of the present invention to provide a PSP that overcomes the resolution limitation of the current devices.

It is another purpose of the present invention to provide a PSP that uses both dimensions of the SLM array rather than only one of them.

Further purposes and advantages of this invention will appear as the description proceeds.

SUMMARY OF THE INVENTION

In a first aspect the invention is a method for achieving ultrahigh spectral resolution. The method comprises:
a) passing an input signal through spectrally shifted spectral high resolution encoders to encode spectral information in the input signal;
b) combining the encoded spectral information such that the spectrum of the encoded spectral information will span the entire spectrum of the input signal;
c) passing the combined encoded spectral information through a time-to-space converter;
d) detecting the encoded spectral information; and
e) decoding the detected information.

In embodiments of the method the input signal comprises any one of optical frequency, radio frequency, and terahertz frequency radiation.

Embodiments of the method can be used in a LiFi communication system.

In embodiments of the method:
a) the information is optical information;
b) the spectrally shifted spectral high resolution encoders are at least two parallel Fabry-Perot interferometers (FPI) having different cavity lengths;
c) combining the encoded spectral information is accomplished by selecting the number and cavity lengths of the FPIs;
c) the time-to-space converter is a diffractive or reflective grating, which transmits the encoded spectral information in the space domain to a spatial light modulator (SLM);
d) detection of the encoded spectral information is carried out by at least two detectors, wherein each detector is configured to receive from the SLM encoded spectral information from a different one of the at least two FPIs;
e) the detected information is decoded by software and a processor in a computer.

In a second aspect the invention is an ultrahigh resolution photonic spectral processor (PSP). The PSP comprises an optical system and a computer, wherein:
A. the optical system comprises components configured to:
  a) generate an input signal;
  b) encode spectral information in the input signal;
  c) convert the encoded spectral information from the time to the space domain; and d) detect the encoded spectral information; and
B. the computer comprises components configured to decode the detected information.

Embodiments of the PSP comprise:
a) a source of an input signal;
b) a Fabry-Perot interferometer encoding block comprising a set of at least two parallel Fabry-Perot interferometers (FPIs) each FPI having a different cavity length and a different set of wavelengths;
c) a diffraction grating;
d) a spatial light modulator (SLM); and
e) at least two detectors wherein each detector is configured to receive encoded spectral information from a different one of the at least two FPIs.

In embodiments of the PSP the source of the input signal is configured to generate any one of: optical frequency, radio frequency, and terahertz frequency radiation.

In embodiments of the PSP the source of the input signal is a tunable laser.

Embodiments of the PSP additionally comprise at least one of:
a) an amplifier;
b) a polarization controller;
c) a beam splitter;
d) focusing and collimating lenses;
e) folding mirrors; and
f) an oscilloscope.

In embodiments of the PSP output beams from the FPI encoding block are transmitted through the grating on their way to the SLM. In other embodiments output beams from the FPI encoding block are reflected from the grating on their way to the SLM.

In embodiments of the PSP the encoded spectral information is reflected from the SLM to the detectors. In other embodiments the encoded spectral information is transmitted through the SLM to the detectors.

Embodiments of the PSP can be configured to be incorporated into a LiFi communication system.

All the above and other characteristics and advantages of the invention will be further understood through the following illustrative and non-limitative description of embodiments thereof, with reference to the appended drawings.

BRIEF DESCRIPTION OF THE DRAWINGS

FIG. 5a shows modulation of only the first wavelength and FIG. 5b shows modulation of only the second wavelength.

DETAILED DESCRIPTION OF EMBODIMENTS OF THE INVENTION

Photonic spectral processing is a method of processing temporal signals via spatial modalities and optical elements. The technical problem is how to improve the resolution of the time to space conversion. Presented herein is a method for solving this problem and achieving spectral super resolution by passing optical information through spectrally shifted spectral high resolution encoders and then combining the information. Optical time to space converters are used on the combined information to detect the spectral information at higher resolution after doing proper decoding. The method can be used mutatis mutandis for optical, radio frequency, and terahertz radiation. One practical application of the method would be for use in LiFi communication systems. A specific optical setup and some results of measurements made using it will be described herein below in order to demonstrate the method.

The method is carried out using a novel photonic spectral processor (PSP) that overcomes the resolution limitation of the current devices. The new PSP is able to obtain a spectral resolution of about 50 MHz. In this PSP the input signal passes through a spectral encoding block having high resolution features before it reaches the spatial dispersive element. The encoding block consists of a set of parallel Fabry-Perot interferometers with different cavity lengths such that each interferometer has a slightly shifted output spectrum in a way that the encoding block covers the whole spectrum of the input signal. In addition, the new PSP uses both dimensions of a spatial light modulator (SLM) array rather than only one of them.

Figure 1A:
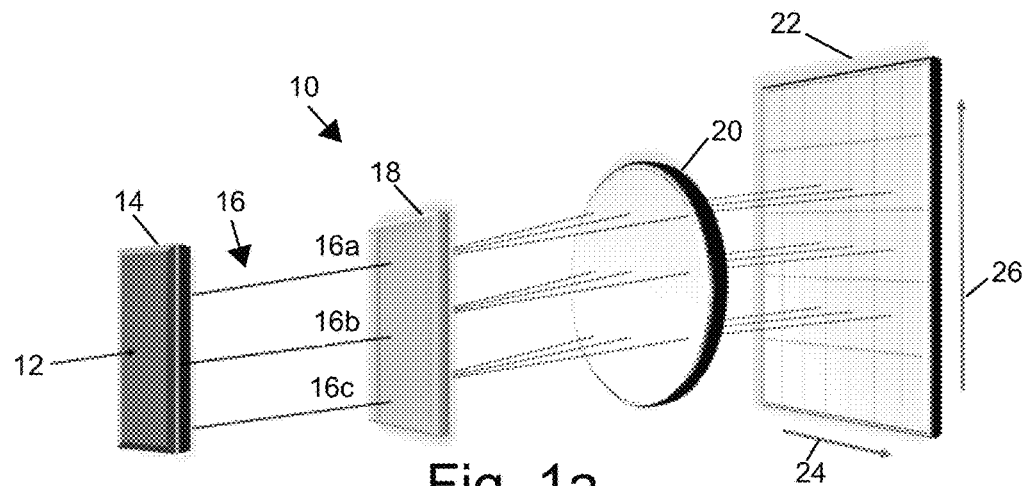
FIG. 1a schematically shows the PSP scheme of the invention.

FIG. 1a schematically shows the ultrahigh resolution photonic spectral processor (PSP) 10 scheme. Input signals 12 pass through a Fabry-Perot Interferometer (FPI) encoding block 14. The output beams 16 then pass through optical diffraction grating 18, and lenses 20 used to collimate and magnify the field that incidents on a liquid-crystal-on-silicon spatial light modulator (LCoS SLM) 22.

In the figure, arrow 24 indicates the direction of the wavelength axis and arrow 26 indicates the direction of the Fabry-Perot axis.

In FIG. 1a the FPI encoding block 14 comprises three FPIs stacked one on top of the other and therefore the output beam 16a, 16b, and 16c from each interferometer goes to a different vertical location on the diffraction grating 18 and arrives at the SLM 22 at a different height as indicated by arrow 26. Each of the output beams 16a, 16b, and 16c contains a set of wavelengths $(\lambda_1, \lambda_2, \ldots \lambda_n)$. The diffraction grating 18 separates the wavelengths such that different wavelengths from each of the output beams 16a, 16b, and 16c are focused on different columns of the SLM 22 as indicated by arrow 24. Thus both dimensions of the SLM 22 are used. Finally, the SLM 22 modulates the spectral amplitude and phase of the signal. In this case the modulated signals are transmitted through SLM 22 to separate detectors (not shown in the figure) for each of the three FPIs.

Figure 1B:
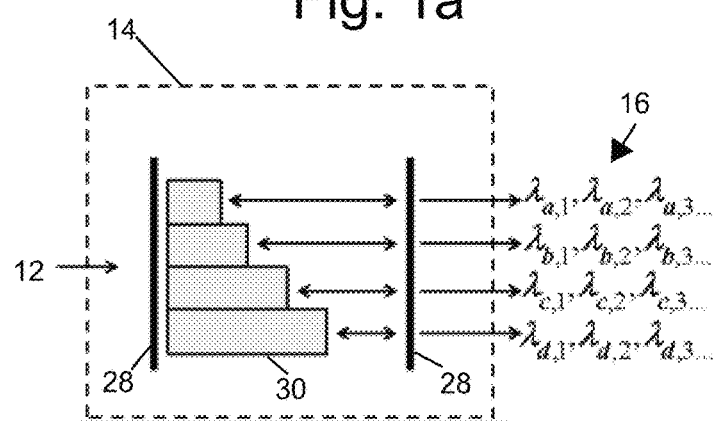
FIG. 1b schematically shows a FPI block that comprises a set of parallel Fabry-Perot interferometers.

The FPI block 14 shown in FIG. 1b consists of a set of parallel Fabry-Perot interferometers, each having a different cavity length, and thus a different set of output wavelengths 16. In the FPI block 14, parallel vertical lines represent the mirrors 28 and the rectangles 30 represent the cavities of the plurality of Fabry-Perot interferometers in the set. In the example shown in FIG. 1b, the FPI block 14 comprises four FPI interferometers however the invention can be carried out using a different number of interferometers, for example 2, 3, or more than four.

The resolution limit of the PSP 10 is dictated by the full width at half maximum (FWHM) of the FPIs rather than the resolution of the diffraction grating 18. This is obtained by using PFIs with free spectral ranges (FSRs) higher than the resolution limit of the grating 18. Thus, the diffraction grating 18 can resolve different wavelengths of the same FPI to different columns of the SLM 22. In addition, the different lengths of the cavities of the FPIs should be designed such that the spectrum of the array in the FPI block 14 will span the entire spectrum of the input signal 12. Since the resolution of PSP 10 is limited by the FWHM of the PFIs rather than the resolution of the diffraction grating 18, a considerable resolution enhancement is obtained, since the resolution of the diffraction grating 18 is about a few GHz while the FWHM of the FPI can be three orders of magnitude lower.

Figure 2:
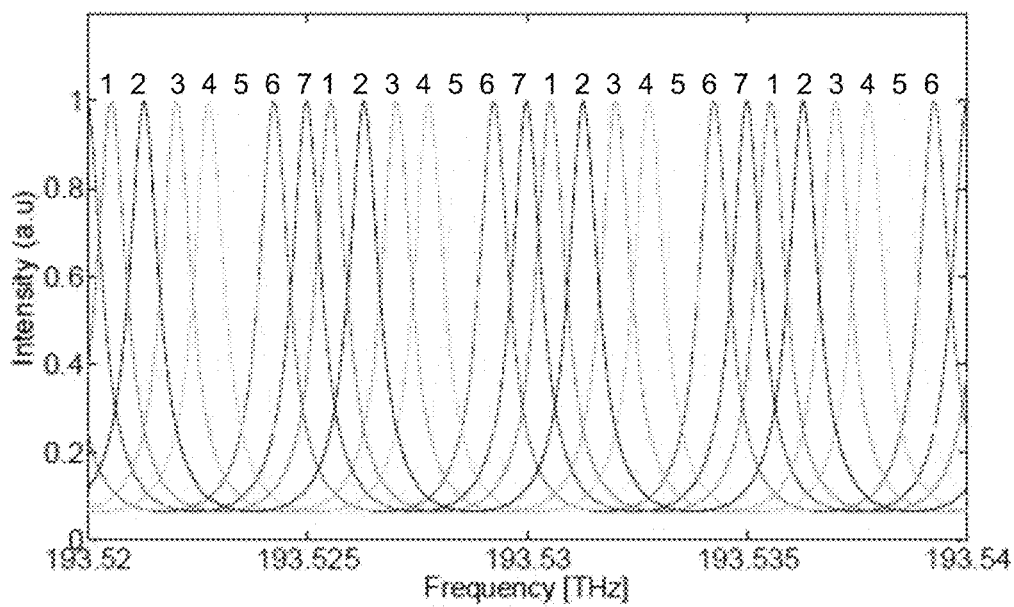
FIG. 2 shows graphs representing the output intensity versus wavelength on an array of FPIs that span a bandwidth of 20 GHz.

FIG. 2 shows an example for spanning a bandwidth of 20 GHz by an array of FPIs. The different lines in the graph represent the output intensity of the FPIs versus wavelength, where the numbers above each line correspond to a different FPI. In this example the FSR of each of the seven interferometers in Fabry-Perot block 14 was chosen to be equal to 5 GHz, while the FWHM was about 700 MHz. Thus, placing all the interferometers in parallel ensured a complete coverage of the bandwidth.

Figure 3A:
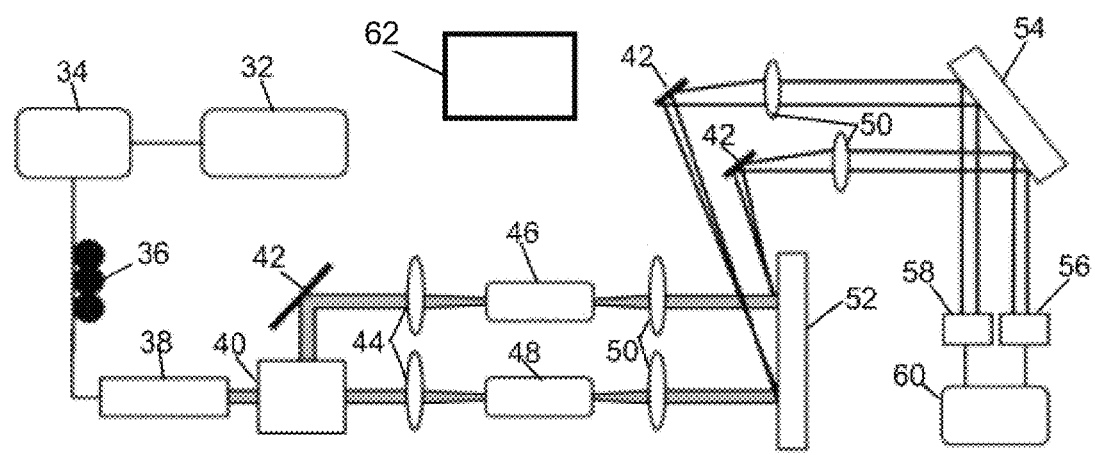
FIG. 3a schematically shows an experimental setup used by the inventors to demonstrate the ability of the PSP of the invention to achieve high spectral resolution.
Figure 3B:
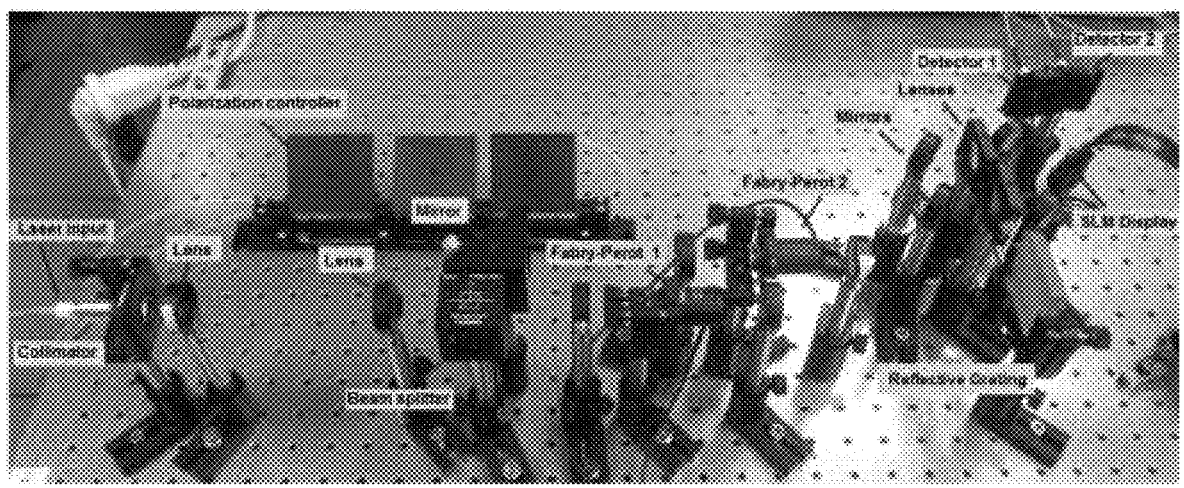
FIG. 3b is a photograph of the experimental setup.

FIG. 3a schematically shows an experimental setup used by the inventors to demonstrate the ability of the PSP of the invention to achieve high spectral resolution. FIG. 3b is a photograph of the experimental setup. A tunable laser source 32 was used in order to scan wavelengths from 1532.4 nm to 1532.5 nm in steps of 0.001 nm (about 125 MHz) with a scanning rate of 0.65 sec per wavelength. After amplification by an Erbium doper fiber amplifier 34 and passing through a polarization controller 36 the laser beam was collimated by collimator 38 and split by a 50/50 beam splitter 40 into two beams. Each beam was filtered by a different Fabry-Perot interferometer (FPI) 46,48. The beams exiting the interferometers 46,48 were collimated onto a reflective grating 52 and then the output of each FPI 46,48 was projected on a different area on the SLM 54. The modulated beams reflected from SLM 50 were measured by two different infra-red detectors 56,58. The output of both detectors 56,58 was displayed and measured on oscilloscope 60. Also shown in FIG. 3 are folding mirrors 42, focusing lenses 44, collimating lenses 50, and computer 62 that comprises a processor and software that inter alia is configured to decode the spectral information encoded by the FPIs.

The two interferometers 46,48 had free spectral ranges of 9.1 GHz and 9.2 GHz with FWHM of 55 MHz and 52 MHz, respectively. The cavity length of each FPI was controlled by an input voltage driving a piezo electric transconducter to determine the output spectrum of each FPI. The output beams of the two interferometers 46,48 propagate to the reflective diffraction grating 52 which has a period length of d=1.67 μm and width of B=50 mm, hence its spectral resolution is [20]:

$$\delta\omega = \frac{d \cdot c}{\lambda \cdot B} \approx 6.45 \text{ GHz} \quad (1)$$

The first orders of the spectrally dispersed back-reflected light were routed to the phase only SLM 54. The polarization controller 36 at the input of the system was used in order to ensure that the polarization of the light reaching the SLM 54 will be aligned with the long axis of the SLM 50.

The cavity lengths of the FPIs 46,48 was set by scanning the above mentioned wavelength range and measuring the intensities at the two detectors 56,58 versus time without any phase modulation at the SLM 54. This measurement was repeated for different cavity lengths of the two interferometers 46,48 until their output wavelengths were as close as possible to each other. The measured results can be seen in FIG. 4.

Figure 4:
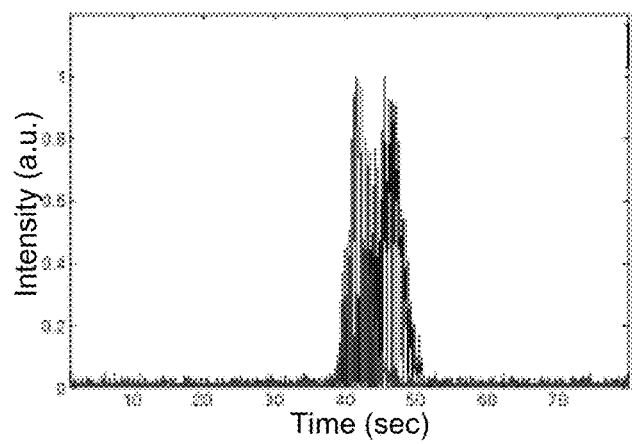
FIG. 4 shows the light intensity as function of time for the Fabry-Perot interferometers of FIG. 3a with wavelength sweep in their inputs.

FIG. 4 shows the light intensity as function of time for the Fabry-Perot interferometers 46 (Black curve) and 48 (grey curve) of FIG. 3a with wavelength sweep in their inputs. Since each 0.65 sec the input laser 32 made a frequency step of 125 MHz, the conversion relation between time differences ΔT to frequency differences Δv given by:

$$\Delta v = \frac{\Delta T}{0.65} \cdot 125 \text{ MHz} \quad (2)$$

According to this relation, the frequency difference between the outputs of the FPIs is 577 MHz, which is much lower than the 6.45 GHz spectral resolution of the reflective grating 52.

Figure 5A:
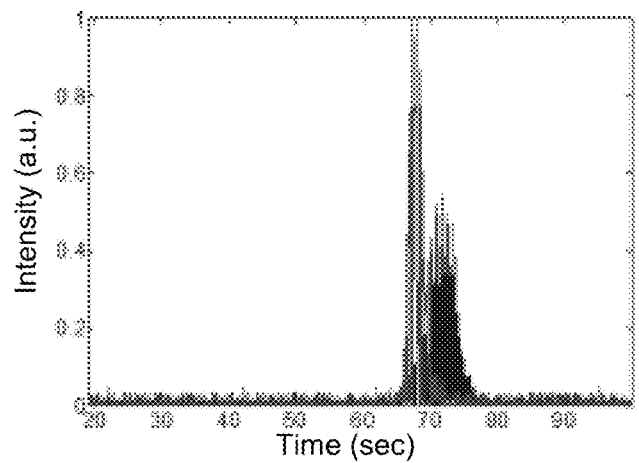
FIG. 5a and FIG. 5b show the light intensity vs. time for the output of the two Fabry-Perot interferometers of FIG. 3a for two wavelengths that are 577 MHz apart where the frequency of the input laser is swept
Figure 5B:
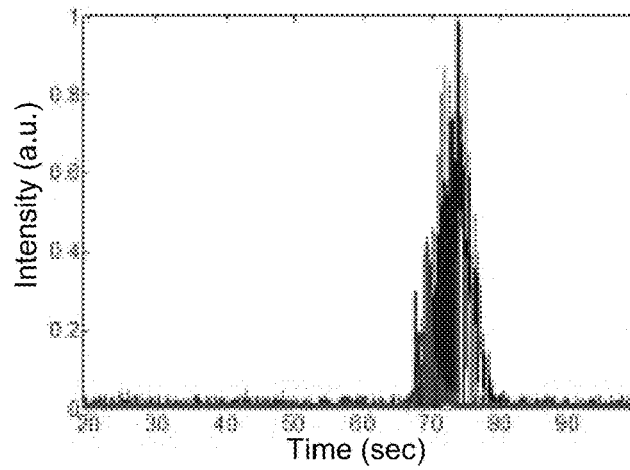

After finding the desired cavities lengths two measurements were made where in each measurement a phase grating was loaded on a different area of the SLM 54 in accordance with the different locations of the two beams on the SLM 54. The spatial gratings written on the SLM 54 were used to shift the output angle of the reflected beams, so the spatial phase modulation would change the measured intensities at the detectors 56,58. The measured intensities versus time for these two measurements can be seen in FIG. 5a for modulation of the first wavelength and FIG. 5b for modulation of the second wavelength. In FIG. 5a and FIG. 5b the black curve is for FP1 46 and the grey curve for FPI 48.

These measurements show that it is possible to modulate each wavelength separately at high spectral resolution of 577 MHz instead of the 6.45 GHz resolution limit of the diffractive grating 52. The 557 MHz limit results from the 500 MHz linewidth of the input laser 32 (In this setup the laser was a HP 8168F). The inventors believe that resolution of the setup shown in FIGS. 3a and 3b, which is dictated by the FWHM of the FPIs 46,48, can be improved to 52 MHz by using a narrow linewidth input laser 32.

Although embodiments of the invention have been described by way of illustration, it will be understood that the invention may be carried out with many variations, modifications, and adaptations, without exceeding the scope of the claims.

BIBLIOGRAPHY

1. A. Krishnan, M. Knapczyk, L. G. de Peralta, A. A. Bernussi and H. Temkin, "Reconfigurable direct space-to-time pulse-shaper based on arrayed waveguide grating multiplexers and digital micromirrors," IEEE Photonics Technology Letters 17(9), 1959-1961 (2005).
2. S. Sohma et al., "Flexible Chromatic Dispersion Compensation Over Entire L$-Band for Over 40-Gb/s WDM Transparent Networks Using Multichannel Tunable Optical Dispersion Compensator," IEEE Photonics Technology Letters 21(17), 1271-1273 (2009).
3. K. Seno, N. Ooba, K. Suzuki, T. Watanabe, K. Watanabe and S. Mino, "Tunable Optical Dispersion Compensator Consisting of Simple Optics With Arrayed Waveguide Grating and Flat Mirror," IEEE Photonics Technology Letters 21(22), 1701-1703 (2009).
4. C. R. Doerr et al., "Colorless tunable optical dispersion compensator based on a silica arrayed-waveguide grating and a polymer thermooptic lens," IEEE Photonics Technology Letters 18(11), 1222-1224 (2006).
5. J. E. Ford and J. A. Walker, "Dynamic spectral power equalization using micro-opto-mechanics," IEEE Photonics Technology Letters 10(10), 1440-1442 (1998).
6. Nabeel A. Riza and M. Junaid Mughal, "Broadband optical equalizer using fault-tolerant digital micromirrors," Opt. Express 11(13), 1559-1565 (2003).
7. D. T. Neilson et al., "Channel equalization and blocking filter utilizing microelectromechanical mirrors," IEEE Journal of Selected Topics in Quantum Electronics 10(3), 563-569 (2004).
8. H. P. Sardesai, C.-C. Chang, and A. M. Weiner, "A Femtosecond Code-Division Multiple-Access Communication System Test Bed," J. Lightwave Technol. 16(11), 1953-1964 (1998)
9. T. Yeminy, D. Sadot, and Z. Zalevsky, "Spectral and temporal stealthy fiber-optic communication using sampling and phase encoding," Opt. Express 19(21), 20182-20198 (2011).
10. Zhaowei Zhang, Chun Tian, M. R. Mokhtar, P. Petropoulos, D. J. Richardson and M. Ibsen, "Rapidly reconfigurable optical phase encoder-decoders based on fiber Bragg gratings," IEEE Photonics Technology Letters, 18(11), 1216-1218 (2006).
11. P. Petropoulos et al., "Demonstration of a 64-chip OCDMA system using superstructured fiber gratings and time-gating detection," IEEE Photonics Technology Letters, 13(11), 1239-1241 (2001).

12. H. Tsuda et al., "Spectral encoding and decoding of 10 Gbit/s femtosecond pulses using high resolution arrayed-waveguide grating," Electronics Letters, 35(14), 1186-1188 (1999).
13. D. Miyamoto and H. Tsuda, "Spectral Phase Encoder Employing an Arrayed-Waveguide Grating and Phase-Shifting Structure," IEEE Photonics Technology Letters, 19(17), 1289-1291 (2007).
14. D. M. Marom et al., "Compact colorless tunable dispersion compensator with 1000-ps/nm tuning range for 40-gb/s data rates," Journal of Lightwave Technology, vol. 24(1), 237-241 (2006).
15. D. Sinefeld and D. M. Marom, "Colorless photonic spectral processor using hybrid guided-wave/free-space optics arrangement and LCoS modulator," in *Conference on Optical Fiber Communication—includes post deadline papers*, (San Diego, Calif. 2009), pp. 1-3.
16. D. Sinefeld and D. M. Marom, "Hybrid Guided-Wave/Free-Space Optics Photonic Spectral Processor Based on LCoS Phase Only Modulator," IEEE Photonics Technology Letters, 22(7), 510-512 (2010).
17. R. Rudnick et al., "Sub-banded/single-sub-carrier drop-demux and flexible spectral shaping with a fine resolution photonic processor," in *The European Conference on Optical Communication*, (Cannes 2014), pp. 1-3.
18. R. Rudnick et al., "Sub-GHz Resolution Photonic Spectral Processor and Its System Applications," Journal of Lightwave Technology 35(11), 2218-2226 (2017).
19. N. Goldshtein et al., "Fine Resolution Photonic Spectral Processor Using a Waveguide Grating Router with Permanent Phase Trimming," Journal of Lightwave Technology 34(2), 379-385 (2016).
20. R. Appelman, Z. Zalevsky, D. Mendlovic and G. Shabtay, "Hybrid optical-RF system for generating an improved linear frequency modulated pulses for radar applications," in *Record of the IEEE 2000 International Radar Conference* [Cat. No. 00CH37037], 2000, pp. 775-780.

The invention claimed is:

1. A method for achieving spectral resolution, the method comprising:
   a) passing an input signal through spectrally shifted spectral resolution encoders comprised of a Fabry-Perot interferometer (FPI) encoding block comprising at least two parallel FPIs having different cavity lengths to encode spectral information in the input signal;
   b) selecting the number and cavity lengths of the FPIs such that the spectrum of the encoded spectral information will span the entire spectrum of the input signal;
   c) combining the encoded spectral information that exits each of the at least two parallel Fabry-Perot interferometers (FPI);
   d) passing the combined encoded spectral information to a time-to-space converter comprised of a diffractive or reflective grating;
   e) transmitting the encoded spectral information from each of the SPIs in the space domain from the diffractive or reflective grating to a different area on a spatial light modulator (SLM);
   f) modulating the spectral amplitude and phase of the encoded spectral information by the SLM;
   g) detecting the modulated encoded spectral information using at least two detectors, wherein each detector is configured to receive encoded spectral information from a different one of the at least two FPIs from the different area on the SLM; and
   h) decoding the detected information using software and a processor in a computer.

2. The method of claim 1, wherein the input signal comprises any one of optical frequency, radio frequency, and terahertz frequency radiation.

3. The method of claim 1, wherein the steps of the method are configured to be used in a LiFi communication system.

4. A photonic spectral processor (PSP) comprising an optical system and a computer, wherein:
   A) the optical system comprises:
      a) components configured to generate an input signal;
      b) a Fabry-Perot interferometer (FPI) encoding block comprising at least two parallel FPIs having different cavity lengths configure to encode spectral information in the input signal;
      c) a diffractive or reflective grating configured to convert the encoded spectral information that exits each of the at least two parallel FPIs from the time to the space domain;
      d) a spatial light modulator (SLM) configured to receive the encoded spectral information from each of the at least two SPIs in the space domain from the diffractive or reflective grating at a different area on the SLM and to modulate the spectral amplitude and phase of the encoded spectral information; and
      e) at least two detectors configured to detect the modulated encoded spectral information, wherein each detector is configured to receive encoded spectral information from a different one of the at least two FPIs from the different area on the SLM; and
   B) the computer comprises software and a processor configured to decode the detected modulated encoded spectral information.

5. The PSP of claim 4, wherein the components configured to generate the input signal are configured to generate any one of: optical frequency, radio frequency, and terahertz frequency radiation.

6. The PSP of claim 5, wherein the component configured to generate the input signal is a tunable laser.

7. The PSP of claim 4, wherein the PSP additionally comprises at least one of:
   a) an amplifier;
   b) a polarization controller;
   c) a beam splitter;
   d) focusing and collimating lenses;
   e) folding mirrors; and
   f) an oscilloscope.

8. The PSP of claim 4, wherein output beams from the FPI encoding block are transmitted through the grating on their way to the SLM.

9. The PSP of claim 4, wherein output beams from the FPI encoding block are reflected from the grating on their way to the SLM.

10. The PSP of claim 4, wherein the encoded spectral information is reflected from the SLM to the detectors.

11. The PSP of claim 4, wherein the encoded spectral information is transmitted through the SLM to the detectors.

12. The PSP of claim 4, configured to be incorporated into a LiFi communication system.

13. The PSP of claim 4, wherein the spectral resolution that is achieved is at 577 MHz.

14. The PSP of claim 4, wherein the spectral resolution that is achieved is improved to 52 MHz by using a narrow linewidth input laser.

* * * * *